(12) United States Patent
OHara et al.

(10) Patent No.: US 11,939,064 B2
(45) Date of Patent: Mar. 26, 2024

(54) RECLINING SEAT

(71) Applicant: Gulfstream Aerospace Corporation, Savannah, GA (US)

(72) Inventors: Timothy OHara, Savannah, GA (US); Joe Guthrie, Savannah, GA (US); Allen Davis, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 17/806,998

(22) Filed: Jun. 15, 2022

(65) Prior Publication Data

US 2023/0406511 A1 Dec. 21, 2023

(51) Int. Cl.
*B64D 11/06* (2006.01)
*A47C 17/04* (2006.01)
*A61G 7/005* (2006.01)

(52) U.S. Cl.
CPC ............ *B64D 11/064* (2014.12); *A47C 17/04* (2013.01); *A61G 7/005* (2013.01); *B64D 11/0641* (2014.12); *B64D 11/0647* (2014.12)

(58) Field of Classification Search
CPC ...... B64D 11/0641; A47C 17/04; A61G 7/005
See application file for complete search history.

(56) References Cited

U.S. PATENT DOCUMENTS

| | | | |
|---|---|---|---|
| 4,419,989 A * | 12/1983 | Herbold | A61G 7/015 482/142 |
| 2002/0070314 A1 | 6/2002 | Schmidt-Schaeffer | |
| 2004/0004383 A1 | 1/2004 | Laurent | |
| 2006/0185089 A1 * | 8/2006 | Davis | A61G 5/006 5/618 |
| 2006/0225212 A1 * | 10/2006 | Parson | A61G 7/012 5/618 |
| 2010/0201167 A1 | 8/2010 | Wieclawski | |
| 2012/0074751 A1 * | 3/2012 | De La Garza | B64D 11/06 297/354.13 |
| 2015/0136904 A1 | 5/2015 | Savard et al. | |
| 2016/0229316 A1 | 8/2016 | Tamura et al. | |
| 2018/0222350 A1 | 8/2018 | Hirayama et al. | |

(Continued)

FOREIGN PATENT DOCUMENTS

| | | | | |
|---|---|---|---|---|
| CA | 2980581 A1 * | 3/2018 | | B60B 2/2222 |
| CN | 101817320 A | 9/2010 | | |

(Continued)

*Primary Examiner* — Timothy J Brindley
(74) *Attorney, Agent, or Firm* — LKGLOBAL | Lorenz & Kopf, LLP (57) ABSTRACT

A reclining seat including, but not limited to, a seat bottom; a seat back, a leg support, and an arm support forming a seat assembly. The seat assembly is configured to be supported on a floor surface and to move between an upright configuration and a flat configuration. The seat back and the leg support are transverse to the seat bottom, and the arm support is transverse to the seat back, when the seat assembly is in the upright configuration. The seat back, the seat bottom, the leg support and the arm support are each longitudinally aligned with one another when the seat assembly is in the flat configuration. An upper surface of the seat back, the seat bottom, and the leg support are each coplanar with one another and substantially coplanar with the arm support when the seat assembly is in the flat configuration.

20 Claims, 6 Drawing Sheets

(56) References Cited

U.S. PATENT DOCUMENTS

| | | | |
|---|---|---|---|
| 2019/0225177 A1 | 7/2019 | Gumprecht et al. | |
| 2019/0283882 A1 | 9/2019 | Wilcynski et al. | |
| 2019/0359105 A1 | 11/2019 | Kondo et al. | |
| 2020/0047890 A1* | 2/2020 | Simpson | B64D 11/0643 |
| 2021/0030161 A1* | 2/2021 | Henshaw | A47C 7/70 |

FOREIGN PATENT DOCUMENTS

| | | | | |
|---|---|---|---|---|
| CN | 111184369 A | | 5/2020 | |
| CN | 113263966 A | | 8/2021 | |
| DE | 3829470 C1 | | 10/1989 | |
| DE | 10064794 A1 | | 6/2002 | |
| DE | 102019108662 A1 | | 10/2020 | |
| DE | 202022103516 U1 | | 9/2022 | |
| EP | 2233346 A2 | | 9/2010 | |
| EP | 3369613 A1 | | 9/2018 | |
| EP | 4036009 A1 | * | 8/2022 | B64D 11/064 |
| FR | 2923770 A3 | | 5/2009 | |
| GB | 2433433 A | * | 6/2007 | B64D 11/06 |
| JP | 2010095178 A | | 4/2010 | |
| KR | 20190041205 A | * | 4/2019 | |
| KR | 20190142969 A | | 12/2019 | |
| KR | 102088844 B1 | | 3/2020 | |
| KR | 102229901 B1 | * | 3/2021 | |
| KR | 102318752 B1 | | 10/2021 | |
| KR | 20220167934 A | * | 12/2022 | |
| WO | 0069671 A1 | | 11/2000 | |
| WO | 2009004972 A1 | | 1/2009 | |
| WO | 2015049937 A1 | | 4/2015 | |
| WO | WO-2023041729 A1 | * | 3/2023 | |

\* cited by examiner

RECLINING SEAT

TECHNICAL FIELD

The present invention relates generally to seats and more particularly to a reclining seat that can move from a fully upright position to a fully flat position.

BACKGROUND

Reclining seats such as, but not limited to, reclining seats that are used on board vehicles are often called upon to support occupants for prolonged periods of time. For example, on an aircraft engaged in international travel, a passenger may occupy a seat for ten to twenty hours, or longer, depending upon the aircraft's destination. When occupying a seat for such a lengthy period of time, it is anticipated that the passenger will spend a portion of that time sleeping. To accommodate this, many seats on board aircraft are designed to recline and, in some instances, to fold flat to allow a passenger to lie down and sleep.

However, such seats must also accommodate the passenger in an upright sitting position. Because it is anticipated that the seat occupant will spend the majority of his/her time sitting rather than lying down and sleeping, such seats are commonly designed and constructed with shapes and contours that provide support, such as thigh support and lumbar support, that are positioned to accommodate a sitting passenger's comfort needs. When these shaped and contoured seats are reclined to a flat orientation, these shapes and contours can become a source of discomfort to the occupant.

In addition, armrests for reclining seats on board aircraft as well as in other applications conventionally remain static and immobile when the seat is reclined and folded flat. This leads to a situation where the occupant in a seat that has been folded completely flat is confined by lateral boundaries (the arm rests) that may restrict the occupant's movement and that may obstruct the occupant from assuming a desired position while lying down. Further, static armrests may obstruct the occupant from egressing from the seat when the seat is the in the flat configuration.

Regarding the shape and contour of the seat creating a potentially uncomfortable environment for the occupant when the seat is folded flat, that situation has been addressed by U.S. patent application Ser. No. 17/657,915, on 4 Apr. 2022 (hereinafter referred to as the "'915 Application"). The '915 Application has been assigned to the assignee of the present disclosure and is hereby incorporated herein by reference in its entirety.

Regarding the armrests confining and obstructing the seat occupant when the seat is in the flat configuration, it is desirable to provide a reclining seat that addresses this concern. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a reclining seat are disclosed herein.

In a first non-limiting embodiment, the reclining seat includes, but is not limited to, a seat bottom. The reclining seat further includes, but is not limited to, a seat back coupled with the seat bottom. The reclining seat further includes, but is not limited to, a leg support coupled with the seat bottom. The reclining seat still further includes, but is not limited to, an arm support coupled with one of the seat back and the seat bottom. The seat bottom, the seat back, the leg support and the arm support comprise a seat assembly. The seat assembly is configured to be supported on a floor surface. The seat assembly is configured to move between an upright configuration and a flat configuration. The seat back and the leg support are transverse to the seat bottom and the arm support is transverse to the seat back when the seat assembly is in the upright configuration. The seat back, the seat bottom, the leg support, and the arm support are each longitudinally aligned with one another when the seat assembly is in the flat configuration. An upper surface of the seat back, an upper surface of the seat bottom, and an upper surface of the leg support are each coplanar with one another when the seat assembly is in the flat configuration. The upper surface of the arm support is substantially coplanar with the upper surface of the seat back, the upper surface of the seat bottom and the upper surface of the leg support when the seat assembly is in the flat configuration.

In another non-limiting embodiment, the reclining seat includes, but is not limited to a seat bottom. The reclining seat further includes, but is not limited to, a seat back coupled with the seat bottom. The reclining seat further includes, but is not limited to, a leg support coupled with the seat bottom. The reclining seat further includes, but is not limited to, an arm support coupled with one of the seat back and the seat bottom. The seat bottom, the seat back, the leg support and the arm support comprise a seat assembly. The seat assembly is configured to be supported on a floor surface. The seat assembly is configured to move between an upright configuration, a reclined configuration, and a flat configuration. The seat back and the leg support are transverse to the seat bottom, and the arm support is transverse to the seat back when the seat assembly is in the upright configuration. The seat back and the leg support are reclined with respect to the floor surface when the seat assembly is in the reclined configuration. The seat back, the seat bottom, the leg support and the arm support are each longitudinally aligned with one another when the seat assembly is in the flat configuration. An upper surface of the seat back, an upper surface of the seat bottom, an upper surface of the leg support, and an upper surface of the arm support are each coplanar with one another when the seat assembly is in the flat configuration.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved reclining seat is disclosed herein. In a non-limiting embodiment, the reclining seat includes arm supports that are configured to provide support for the arms of a seat occupant while the seat is in both an upright configuration and a reclined orientation but which are configured to fold flat and come into substantial coplanar alignment with the remainder of the seat when the reclining seat is in the flat configuration. As used herein, the term "substantial coplanar alignment" and the term "substantially coplanar", when referring to the relative position of the upper surface of the arm supports with respect to the upper surfaces of the other components of the seat assembly, shall mean a condition wherein, to the extent that the upper surface of the arm supports protrude above the upper surfaces of the other components of the seat assembly, it is only a cushion portion of the arm supports that protrudes above the upper surfaces of the other components of the seat assembly. In an embodiment, when the reclining seat is in the upright and/or reclined configuration, the arm supports are in an elevated position relative to the seat bottom of the reclining seat. However, when the reclining seat is placed in the flat configuration such that the seat back, the seat bottom, and the leg support are longitudinally aligned with one another and such that the respective upper surfaces of these components are coplanar with one another, the arm rest moves down to be adjacent to, and longitudinally aligned with, the seat back, the seat bottom, and the leg support. In addition, when the reclining seat is in the flat configuration, the arm supports are positioned such that an upper surface of the arm supports are substantially co-planar with an uppermost surface of the seat back, the seat bottom, and the leg support. In this manner, the arm supports extend the width of the flat surface available for the seat occupant to lie on when sleeping or resting in the reclining seat while the reclining seat is in the flat configuration, and are positioned to avoid obstructing a seat occupant from egressing from the seat while the seat is in the flat configuration.

A greater understanding of the reclining seat discussed above may be obtained through a review of the illustrations accompanying this application together with a review of the detailed description that follows.

Figure 1:
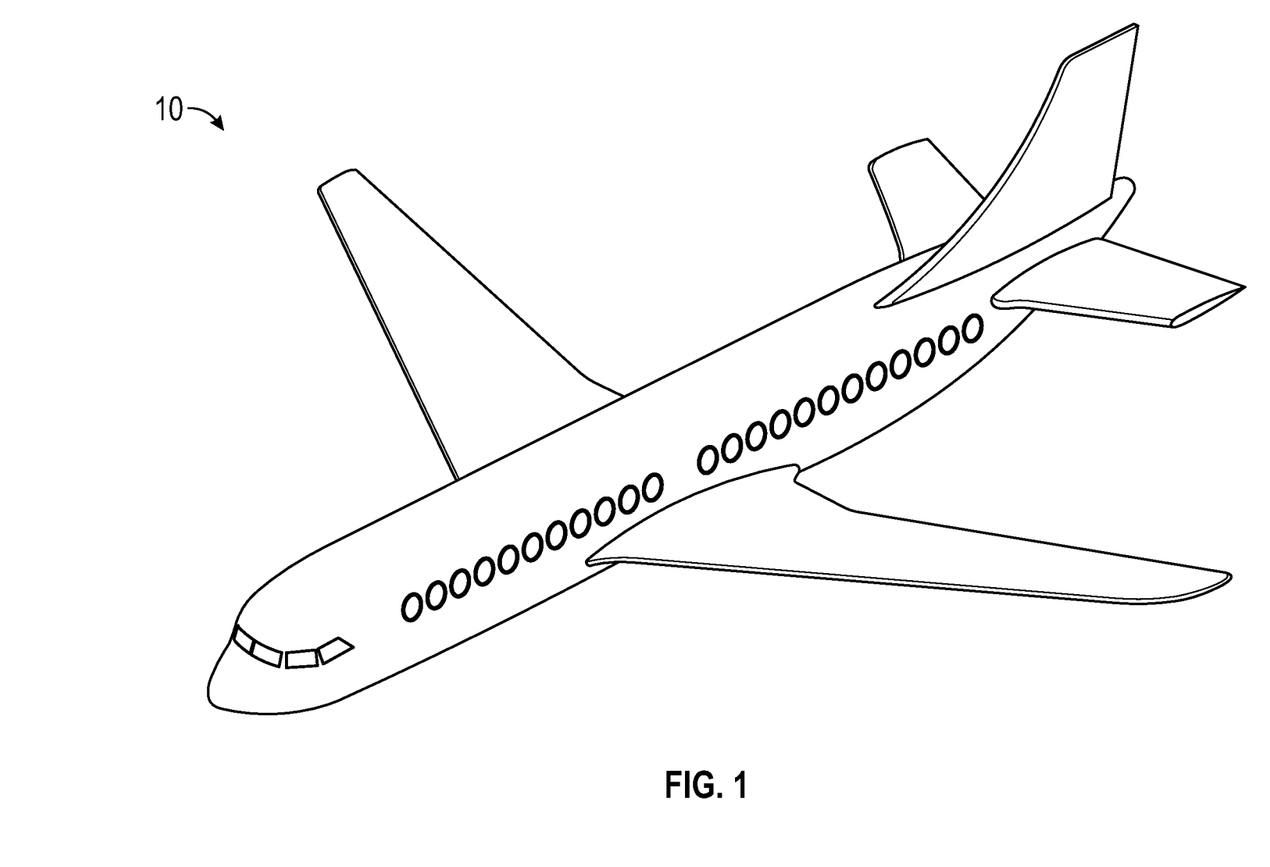
FIG. 1 is a perspective view illustrating a vehicle suitable for use with a reclining seat disclosed herein.

FIG. 1 is a perspective view illustrating a vehicle 10 suitable for use with embodiments of a reclining seat 20 (see FIG. 2) disclosed herein. In the illustrated embodiment, vehicle 10 is depicted as an aircraft. While the reclining seat disclosed herein is compatible for use onboard an aircraft, it should be understood that the application of the disclosed reclining seat is not limited to such use. Rather, the reclining seat disclosed herein is compatible with all types of vehicles including, but not limited to, automobiles, busses, recreational vehicles, trains, watercraft, spacecraft, and the like. It should be further understood that embodiments of the reclining seat disclosed herein may be employed in applications other than on or in vehicles. For example, and without limitation, embodiments of the reclining seat disclosed herein may be used in home furniture applications, in office furniture applications, in outdoor furniture applications, in arenas, in stadiums, in theaters, and in other public venues, and in any other application where a person may wish to transition between an upright seated position and a supine position while occupying a single seat. Further, although the embodiment of the reclining seat illustrated herein has been depicted as a single reclining seat designed to accommodate a single seat occupant, it should be understood that the teachings of the present disclosure may also be applied to multi-occupant seating accommodations as well.

Figure 2:
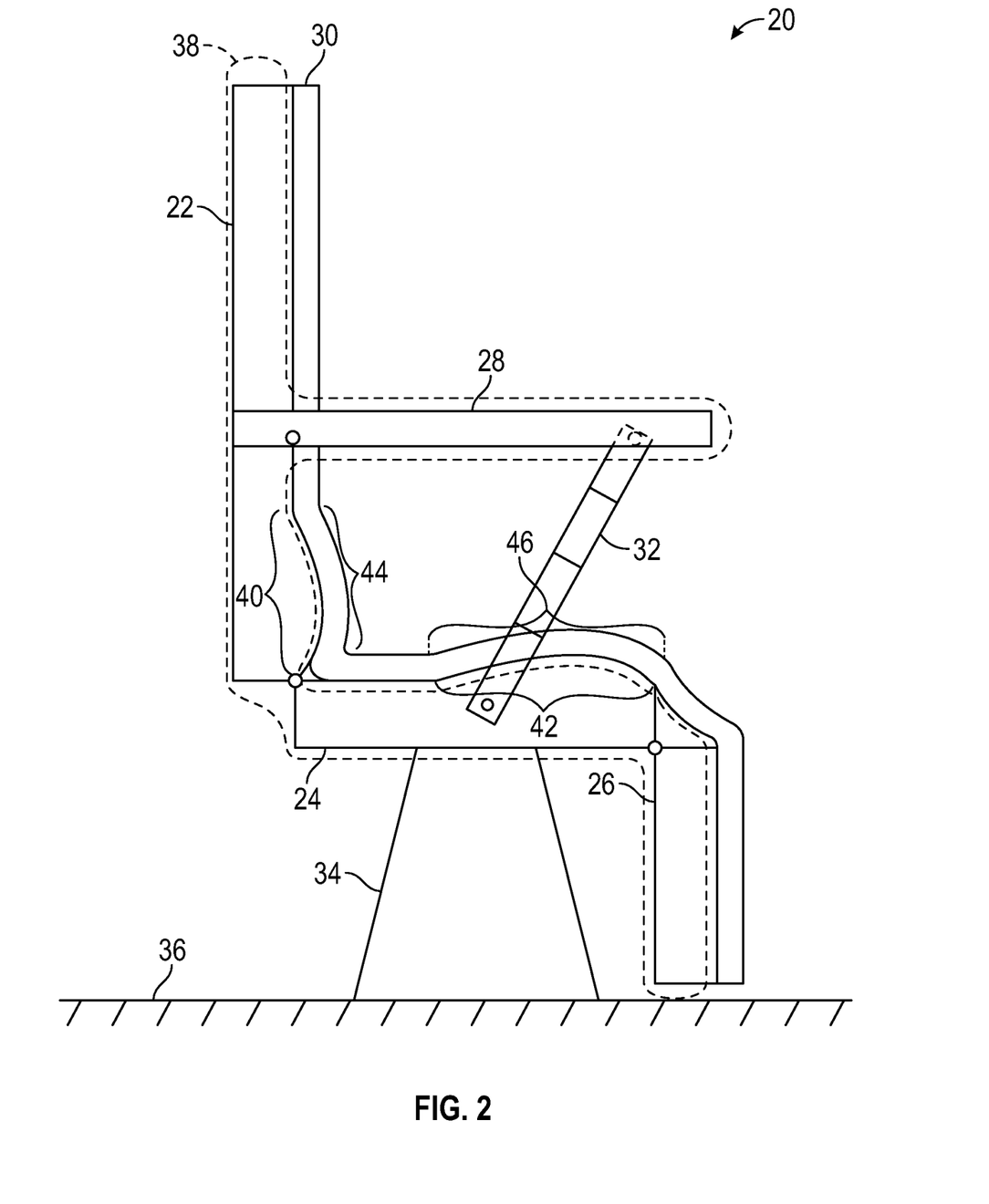
FIG. 2 is a schematic side view illustrating a non-limiting embodiment of the reclining seat made in accordance with the teachings disclosed herein, the reclining seat being presented in an upright configuration.

With continuing reference to FIG. 1, FIG. 2 is a schematic side view illustrating a non-limiting embodiment of reclining seat 20 made in accordance with the teachings of the present disclosure. In the illustrated embodiment, reclining seat 20 includes a seat back 22, a seat bottom 24, a leg support 26, an arm support 28, a cushion 30, an arm support buttress 32, and a seat base 34. Reclining seat 20 is supported on a floor surface 36. Seat back 22, seat bottom 24, leg support 26 and arm support 28 together comprise a seat assembly 38.

Seat back 22 is configured to support the back of the human occupant of reclining seat 20. Seat back 22 may comprise any suitable rigid support structure such as a seat back frame. In an embodiment, seat back 22 may be covered with an upholstery layer (not shown) and may include a cushion (not shown). In the illustrated embodiment, seat back 22 does not include a cushion.

Seat bottom 24 is configured to support the posterior of a human occupant of reclining set 20. In a non-limiting embodiment, seat bottom 24 may comprise any suitable rigid support structure such as a seat bottom frame. In an embodiment, seat bottom 24 may be covered by an upholstery layer (not shown) and may include a cushion (not shown). In the illustrated embodiment, seat bottom 24 does not include a cushion.

Figure 4:
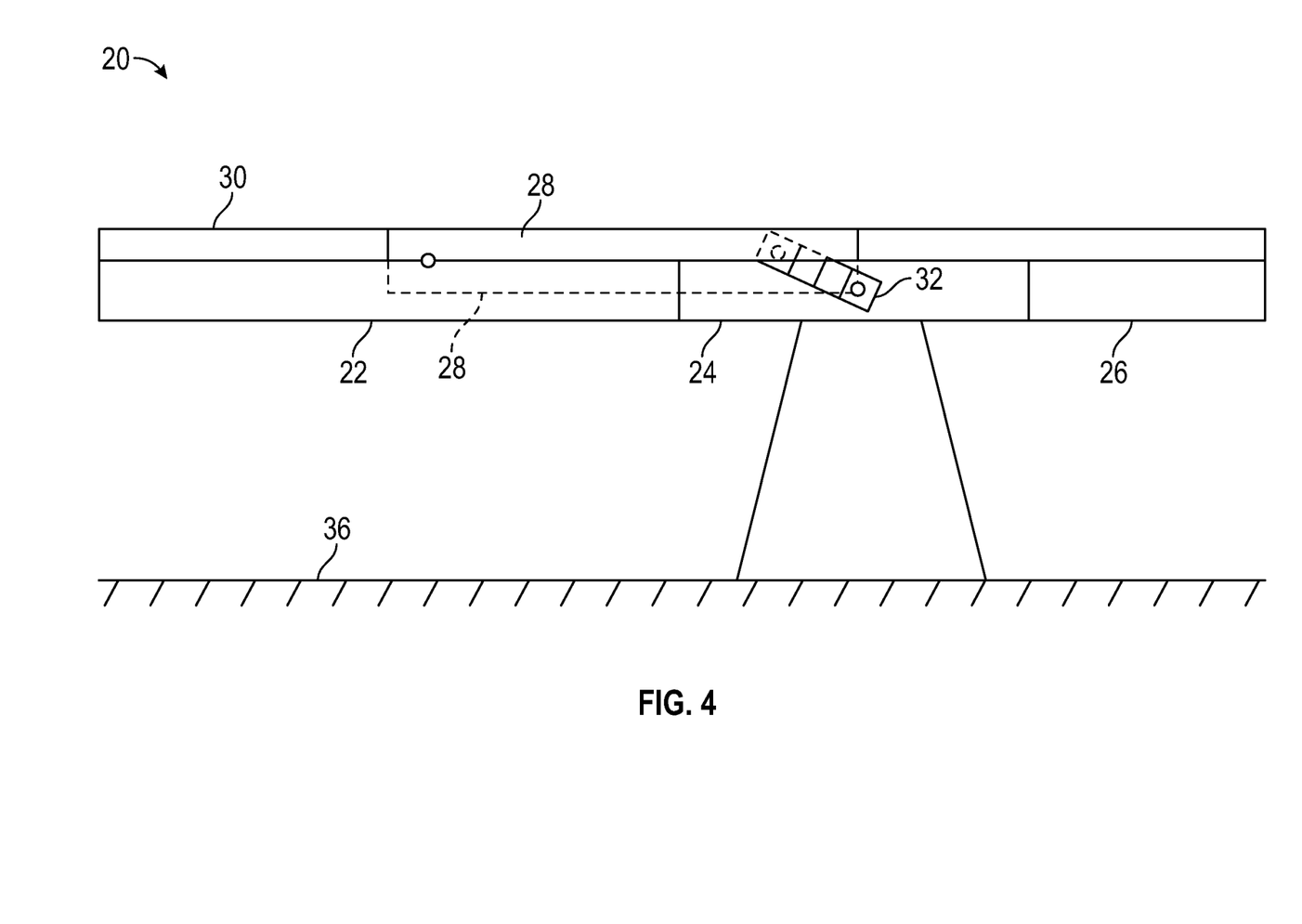
FIG. 4 is a schematic side view illustrating the reclining seat of FIG. 2 presented in a flat configuration.
Figure 5:
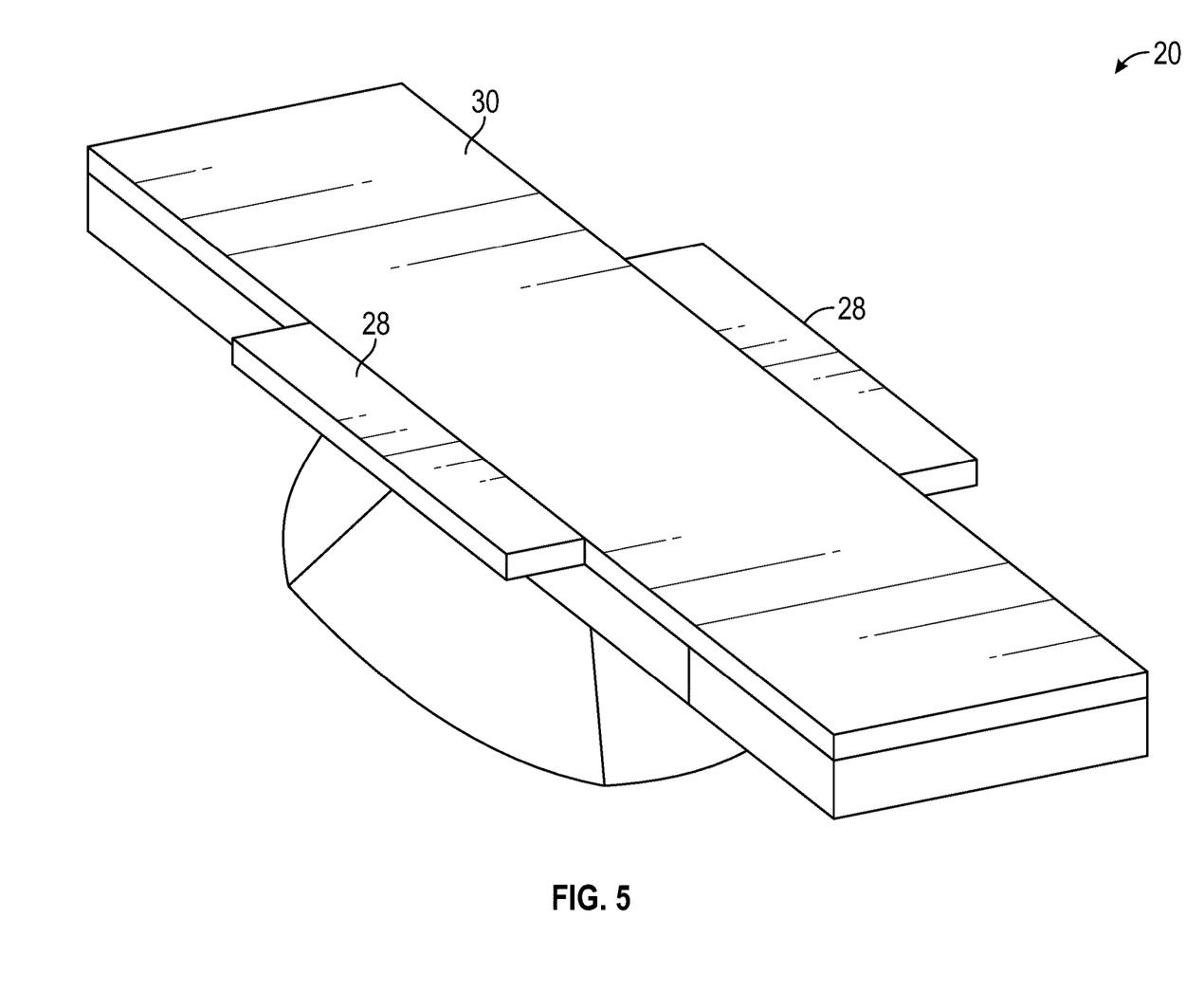
FIG. 5 is a perspective view of the reclining seat illustrated in FIG. 4.

Seat back 22 is pivotally coupled with seat bottom 24. Any suitable mechanism effective to permit pivotal movement of seat back 22 with respect to seat bottom 24 may employed. Seat back 22 is configured to pivot with respect to seat bottom 24 between an upright position (as illustrated in FIG. 2) and a flat position (as illustrated in FIGS. 4 and 5). Such pivotal motion may be facilitated via any suitable means effective to cause seat back 22 to pivot with respect to seat bottom 24. In a non-limiting embodiment, such pivotal motion may be accomplished manually through the use of a biasing means, a latch, and a release mechanism (not shown). In another non-limiting embodiment, such pivotal motion may be accomplished electronically through the use of a motor and an operatively coupled user input device (not shown). Any other methods and/or mechanisms effective to cause such pivotal motion may alternatively be employed without departing from the teachings of the present disclosure.

Leg support 26 is configured to support the legs of the human occupant of reclining seat 20. Leg support 26 may comprise any suitable rigid support structure such as a leg support frame. In an embodiment, leg support 26 may be covered with an upholstery layer (not shown) and may include a cushion (not shown). In the illustrated embodiment, leg support 26 does not include a cushion.

Leg support 26 is pivotally coupled with seat bottom 24. Any suitable mechanism effective to permit pivotal movement of leg support 26 with respect to seat bottom 24 may employed. Leg support 26 is configured to pivot with respect to seat bottom 24 between a folded-down position (as illustrated in FIG. 2) and a raised position (as illustrated in FIGS. 4 and 5). Such pivotal motion may be facilitated via any suitable means effective to cause leg support 26 to pivot with respect to seat bottom 24. In a non-limiting embodiment, such pivotal motion may be accomplished manually through the use of a biasing means, a latch, and a release mechanism (not shown). In another non-limiting embodiment, such pivotal motion may be accomplished electronically through the use of a motor and an operatively coupled user input device (not shown). Any other methods and/or mechanisms effective to cause such pivotal motion may alternatively be employed without departing from the teachings of the present disclosure.

Arm support 28 is configured to support the arms of the human occupant of reclining seat 20. Arm support 28 may comprise any suitable rigid support structure. In an embodiment, arm support 28 may be covered with an upholstery layer (not shown) and may include a cushion.

Arm support 28 is pivotally coupled with seat back 22. Arm support 28 is configured to pivot with respect to seat back 22 between a transverse position (as illustrated in FIG. 2) and an aligned position (as illustrated in FIGS. 4 and 5). Such pivotal movement may be facilitated via any suitable means effective to cause arm support 28 to pivot with respect to seat back 22. In a non-limiting embodiment, such pivotal movement may be accomplished manually through the use of a biasing means, a latch, and a release mechanism (not shown). In another non-limiting embodiment, such pivotal motion may be accomplished electronically through the use of a motor and an operatively coupled user input device (not shown). Any other methods and/or mechanisms effective to cause such pivotal motion may alternatively be employed without departing from the teachings of the present disclosure.

In the illustrated embodiment, seat back 22 and seat bottom 24 are configured such that the contours of their respective hard substrates vary/are modified based on the configuration of seat assembly 38. Seats with substrates that have contours that change as the seat is moved from one configuration to another configuration are know in the art. One such seat uses multiple bars and conforming plates to control the surface contour of the seat. This technology is disclosed in the '915 Application which has been incorporated herein by reference. It should be understood that in other embodiments any other mechanism, construction, design, and/or technology that is effective to modify the contours of the various components of seat assembly 38 as seat assembly 38 is moved between different configurations may also be employed by reclining seat 20 without departing from the teachings of the present disclosure. In still other embodiments seat back 22 and seat bottom 24 may have contours that are static and that remain static as seat assembly 38 moves between the upright configuration and the flat configuration.

In FIG. 2, seat assembly 38 is illustrated in an upright configuration. When reclining seat 20 is employed on an aircraft, the upright configuration illustrated in FIG. 2 may be employed during the taxi, take-off, and landing phase of a flight. As illustrated in FIG. 2, while seat assembly 38 is in the upright configuration, seat back 22 is contoured to include a bump-out 40 and seat bottom 24 is contoured to include a bump-out 42. Bump-out 40 provides a seat occupant with support in the lumbar region of his/her back. Bump-out 42 provides a seat occupant with support under the seat occupant's thighs. Bump-out 40 and bump-out 42 are provided to enhance the seat occupant's comfort. As discussed below, as seat assembly 38 moves to the flat configuration, bump-out 40 and bump-out 42 will recede until the bump-out portions of seat back 22 and seat bottom 24 are completely flat.

In the illustrated embodiment, cushion 30 is an elongate cushion extending along an entire upper surface of seat back 22 and seat bottom 24 and leg support 26. In an embodiment, cushion 30 may be attached to an upper surface of seat back 22 and to an upper surface of seat bottom 24 and to an upper surface of leg support 26. In another embodiment, a top portion of cushion 30 may be attached to a top portion of seat back 22 and a bottom portion of cushion 30 may be attached to a bottom portion of leg support 26. In another embodiment, only an upper portion of cushion 30 may be attached to an upper portion of seat back 22. Any other attachment scheme effective to secure cushion 30 to seat assembly 38 may be employed without departing from the teachings of the present disclosure. The actual attachment of cushion 30 to seat assembly 38 may be accomplished in any suitable manner that is effect to securely couple cushion 30 to seat assembly 38 such that cushion 30 remains coupled with seat assembly 38 throughout the period of time that reclining seat 20 is occupied by a seat occupant and throughout the various configurations assumed by seat assembly 38 as it moves from the upright configuration to the flat configuration.

In the illustrated embodiment, cushion 30 has a uniform thickness along both its lateral axis (from side-to-side in the direction of an imaginary Z-axis extending into the page of FIG. 2) and its longitudinal axis (extending in the direction from the upper end of seat back 22 to the lower end of leg support 26). While a conventional reclining seat may have an individual cushion associated with each individual seat component (e.g., the seat back and the seat bottom and the leg support may each have their own individual seat cushions) and while each individual cushion may have a varying thickness along its length to provide a desired contour to accommodate and support the occupant's body while the occupant resides in a predetermined posture, seat cushion 30 instead relies on the contours imparted by the reconfigurable hard substrates of seat back 22 and seat bottom 24 and, in turn, transmits those contours to the seat occupant to provide such supportive contouring. For example, as illustrated in FIG. 2, in the vicinity of bump-out 40, cushion 30 includes a bump-out 44 and in the vicinity of bump-out 42, cushion 30 includes a bump-out 46. In this manner, cushion 30 is well suited to provide comfort to a seat occupant in each and every configuration assumed by seat assembly 38.

While the embodiment illustrated in FIG. 2 depicts a single cushion 30 extending along an entire length of reclining seat 20 from a top of backrest 22 to a bottom of leg support 26, it should be understood that in other embodiments, a plurality of cushions 30 may be employed, each extending for only a portion of the total longitudinal length of reclining seat 20. For example, three discrete cushions 30 may be employed with reclining seat 20 wherein each such cushion 30 would have a length corresponding to one of the three components comprising the seating surface (seat back 22, seat bottom 24, and leg support 26) of reclining seat 20. Each cushion 30 would be coupled with the upper surface of its corresponding seat component. In yet another embodiment, seat back 22, seat bottom 24, and leg support 26 may each include their own integral seat cushion disposed over their respective hard substrate and below their respective upholstery layer.

Arm support buttress 32 may comprise any structure effective to support arm support 28 in the various configurations and orientations that arm support 28 resides in as seat assembly 38 moves between the upright configuration and the flat configuration. In the upright configuration illustrated in FIG. 2, arm support 28 extends transversely from seat back 22. In the illustrated embodiment, arm support buttress 32 extends up from seat bottom 24 at an obtuse angle to support a distal portion of arm support 28 in an orientation that is transverse seat back 22.

In the illustrated embodiment, arm support buttress 32 has a plurality of telescoping segments that are configured to permit arm support buttress 32 to have a variable length. This telescoping configuration and corresponding variable length facilitates the ability of arm support buttress 32 to support arm support 28 in the various orientations that arm support 28 will reside in as seat assembly 38 moves between the upright configuration and the flat configuration. It should be understood that a telescoping configuration for arm support buttress 32 is merely one way of facilitating the support and movement of arm support 28 as it moves through the various positions and orientations associated with the upright configuration, the flat configuration, and any intermediate configurations for seat assembly 38. In other embodiments, arm support buttress 32 may have a single length and may be coupled with seat bottom 24 and arm support 28 in a position and orientation that does not require a variable length to provide arm support 28 with the support that it needs. In other embodiments, arm support buttress 32 may be omitted from reclining seat 20 entirely and arm support 28 may be mounted to back support 22 via a rotary actuator that is configured to control the pivotal movement of arm support 28 as it moves to its various positions and through its various orientations. In other embodiments, a multi-bar linkage connecting arm support 28 to seat bottom 24 and to seat back 22 may be employed. Such an embodiment may include components that are configured to slide with respect to one another along slots and/or tracks and may include pivots and links that support arm support 28 in various orientations as seat assembly 38 moves between the upright, reclined, and flat positions. In still other embodiments, any other suitable mechanism effective to support arm support 28 and/or to control its pivotal movement may be employed without departing from the teachings of the present disclosure.

In the illustrated embodiment, seat base 34 comprises a pedestal support structure that supports seat assembly 38 above floor surface 36 through engagement with seat bottom 24. In other embodiments, seat base 34 may engage other components of seat assembly 38. In still other embodiments, seat base 34 may engage multiple components of seat assembly 38. While seat base 34 is illustrated as a pedestal support structure in the figures accompanying this disclosure, it should be understood that seat base 34 may comprise any suitable structure that is effective to support seat assembly 38 above floor surface 36. For example, and without limitation, seat base 34 may comprise a plurality of support structures such as chair legs.

In the illustrated embodiment, seat base 34 engages floor surface 36. In other embodiments, rather than engaging floor surface 36, seat base 34 may engage other supporting surfaces such as, but not limited to, a proximate wall surface. In other embodiments of reclining seat 20, seat base 34 may be eliminated and seat bottom 24 may be supported directly by floor surface 36 without departing from the teachings of the present disclosure.

In the illustrated embodiment, seat base 34 is engaged with seat bottom 24 in a manner that permits seat bottom 24 to pivot with respect to seat base 34. Such pivotal movement may be accomplished through the use of a pivotal coupling, through the use of linear actuators, rotary actuators, or by any other manner of coupling and/or by any mechanism that is effective to permit seat bottom 24 to pivot with respect to seat base 34. In other embodiments, seat bottom 24 may be permitted to swivel with respect to seat base 34, thereby permitting seat assembly 38 to swivel with respect to floor surface 36. In still other embodiments, seat bottom 24 may be statically coupled with seat base 34 and therefore inhibited from pivoting and/or swiveling with respect to seat base 34 without departing from the teachings of the present disclosure. In still other embodiments, seat bottom 24 may be configured to translate with respect to seat base 34. Such translation may include movement along either or both an x-axis and a y-axis.

Figure 3:
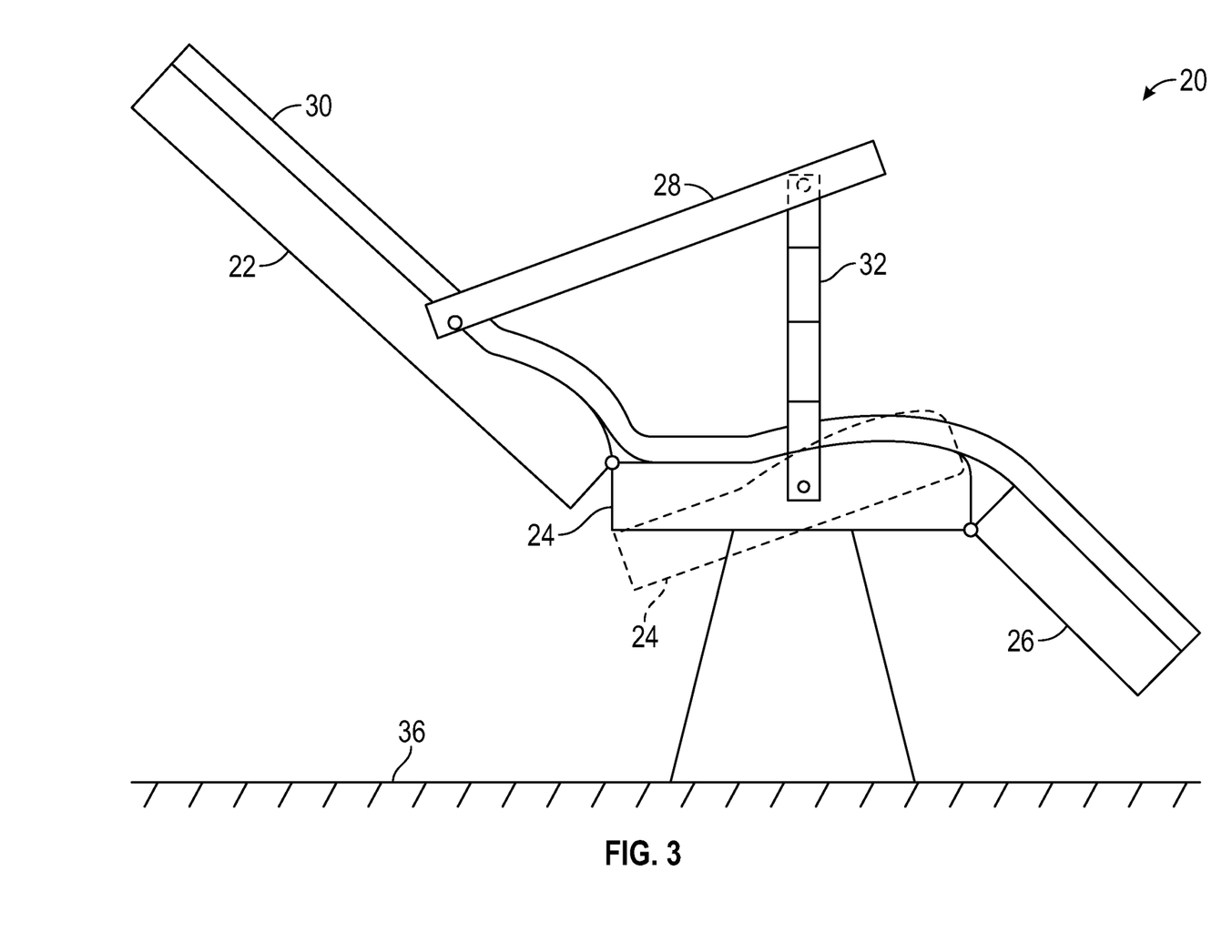
FIG. 3 is a schematic side view illustrating the reclining seat of FIG. 2 presented in a reclined configuration.

With continuing reference to FIGS. 1-2, FIG. 3 is a schematic side view illustrating reclining seat 20 in a reclined configuration. When in the reclined configuration, seat back 22 and leg support 26 are in a reclined orientation. Further, as illustrated in FIG. 2 arm support 28 is presented in an inclined orientation. In other embodiments, when reclining seat 20 is in the reclined configuration, arm support 28 may maintain the same orientation with respect to floor surface 36 as its orientation when reclining seat 20 is in the upright configuration. As used herein, the term "reclined" shall mean that the component is in an angular orientation with respect to floor surface 36 such that an upper end of the component (i.e., whichever end of the component is a greater distance from floor surface 36) is disposed aft of the lower end of the component. Conversely, as used herein, the term "inclined" shall mean that the component is in an angular orientation with respect to floor surface 36 such that an upper end of the component is disposed forward of the lower end of the component.

In a variation of the reclined configuration, reclining seat 20 may be placed in a zero-gravity configuration. When in the zero-gravity configuration, the reclined configuration is modified by placing arm support 28 in the inclined orientation (if it is not already in the inclined orientation) and by also placing seat bottom 24 in an inclined orientation (as indicated by the illustration of seat bottom 24 in phantom lines). The zero-gravity configuration can distribute a seat occupant's body weight relatively evenly across the entire longitudinal length of reclining seat 20, thereby reducing or eliminating stress or pressure points on the occupant's body.

With respect to the embodiment illustrated in FIG. 3, in both the reclined configuration and the zero-gravity configuration, arm support buttress 32 has pivoted in a counter-clockwise direction (from the perspective of FIG. 3) to a vertical orientation. When in a vertical orientation, arm support buttress 32 is able to support to arm support 28 in the inclined orientation. Cushion 30 has unfolded as compared with its configuration in FIG. 2 and continues to provide cushioning support to the entire upper surface of seat back 22, seat bottom 24, and leg support 26. Bump-out 40 and bump-out 42 have softened somewhat to accommodate a seat occupant's diminished need for lumbar and thigh support while in the reclined and/or zero-gravity configurations. This softening of the bump-out protrusion reads through cushion 30 to a seat occupant.

With continuing reference to FIGS. 1-3, FIG. 4 is a schematic side view illustrating reclining seat 20 in a flat configuration. When in the flat configuration, seat back 22, seat bottom 24, leg support 26, and arm support 28 are each longitudinally aligned with one another (i.e., their respective longitudinal axes are parallel to one another). In the illustrated embodiment, seat back 22, seat bottom 24, leg support 26, and arm support 28 are each oriented such that their respective longitudinal axes are parallel with floor surface 36. Bump-out 40 and bump-out 42 have receded completely into seat back 22 and seat bottom 24, respectively and the upper surfaces of seat back 22 and seat bottom 24 and are now completely flat along their upper surfaces. This presents a seat occupant with a surface to lay on that is completely flat along its entire longitudinal length.

When reclining seat 20 is in the flat configuration, an upper surface of arm support 28 is substantially coplanar with the upper surface of cushion 30, as indicated in FIG. 4 where arm support 28 is drawn in solid lines. In an embodiment of reclining seat 20 that does not include cushion 30 and/or in embodiments of reclining seat 20 where seat back 22, seat bottom 24, and leg support 28 each include their own individual cushions 30, the upper surface of arm support 28 is substantially co-planar with the upper surfaces of seat back 22, seat bottom 24, and leg support 26 as indicated in FIG. 4 where arm support 28 is drawn in phantom lines. To support arm support 28 in the illustrated position, arm support buttress 32 is fully telescopically collapsed to accommodate the diminished distance between arm support 28 and seat bottom 24.

With continuing reference to FIGS. 1-4, FIG. 5 is a perspective view of reclining seat 20 in the flat configuration. As best illustrated in FIG. 5, a seat occupant wishing to lay down and sleep is presented with a completely flat horizontal surface devoid of undulations or other topographical features. In addition, because both arm supports 28 are folded down such that their upper surfaces are coplanar with the upper surface of cushion 30, the seat occupant has a wider surface to provide additional support that is unconfined in the lateral direction and that is therefore able to provide support for a wider variety of sleeping positions than can be accommodated by a conventional seat that is configured to fold flat but that has static arm supports.

With continuing reference to FIGS. 1-5, FIG. 6 is a schematic side view illustrating a reclining seat 50. Reclining seat 50 is substantially identical to reclining seat except that when reclining seat 50 is disposed in the flat configuration, seat assembly 28 is canted at an angle with respect to floor surface 36. The angle may comprise any suitable angle between zero degrees and ten degrees. In a non-limiting example, the angle between seat assembly 28 and floor surface 36 may comprise three degrees.

Figure 6:
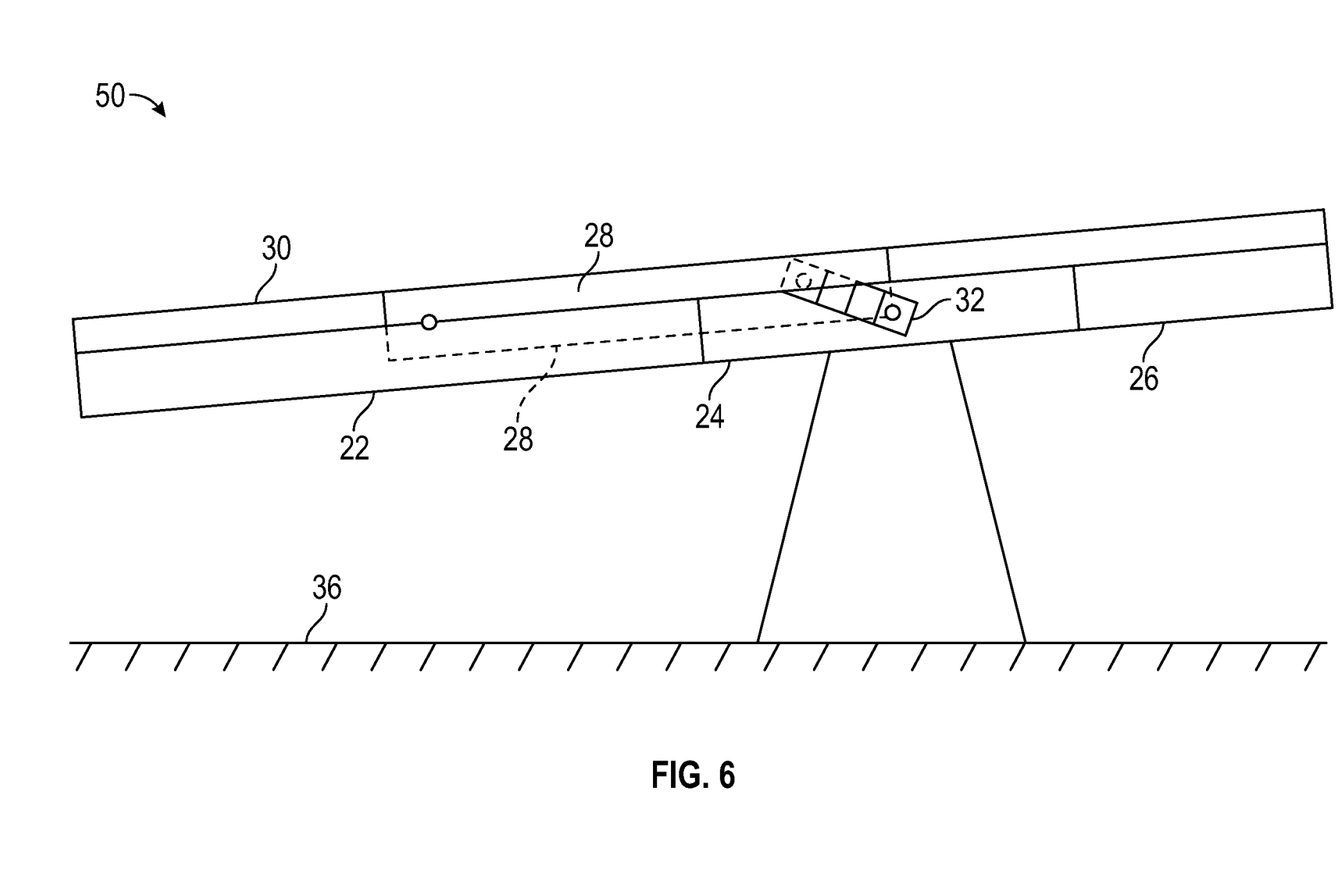
FIG. 6 is a schematic side view illustrating another embodiment of the reclining seat of FIG. 2 presented in a flat configuration.

When reclining seat 50 is employed on aircraft 10, this angle will offset the angle of attack at which aircraft 10 flies. In this manner, a passenger lying down in reclining seat 50 while reclining seat 50 is in the flat configuration will be disposed in an orientation that is substantially horizontal with respect to the earth for enhanced comfort.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A reclining seat comprising:
   a seat bottom;
   a seat back coupled with the seat bottom;
   a leg support coupled with the seat bottom; and
   an arm support coupled with one of the seat back and the seat bottom,
   a telescoping buttress coupling the arm support to the one of the seat back and the seat bottom,
   wherein the seat bottom, the seat back, the leg support and the arm support comprise a seat assembly;
   wherein the seat assembly is configured to be supported on a floor surface,
   wherein the seat assembly is configured to move between an upright configuration and a flat configuration,
   wherein the seat back and the leg support are transverse to the seat bottom, and wherein the arm support is transverse to the seat back when the seat assembly is in the upright configuration,
   wherein the seat back, the seat bottom, the leg support and the arm support are each longitudinally aligned with one another when the seat assembly is in the flat configuration, and
   wherein an upper surface of the seat back, an upper surface of the seat bottom, and an upper surface of the leg support are each coplanar with one another when the seat assembly is in the flat configuration and wherein the upper surface of the arm support is substantially coplanar with the upper surface of the seat back, the upper surface of the seat bottom and the upper surface of the leg support when the seat assembly is in the flat configuration.

2. The reclining seat of claim 1, wherein the upper surface of seat back, the upper surface of the seat bottom, the upper surface of the leg support, and the upper surface of the arm support are each parallel to one another and canted at an angle of less than ten degrees with respect to the floor surface when the seat assembly is in the flat configuration.

3. The reclining seat of claim 1, wherein the arm support is coupled with both the seat bottom and the seat back.

4. The reclining seat of claim 3, wherein the arm support is pivotally coupled with both the set bottom and the seat back.

5. The reclining seat of claim 1, further comprising a cushion extending over the seat back and the seat bottom and the leg support, the cushion having a uniform thickness along an entire longitudinal length of the cushion.

6. The reclining seat of claim 5, wherein the upper surface of the cushion comprises the upper surface of the seat back, the upper surface of the seat bottom, and the upper surface of the leg support, and wherein the upper surface of the arm support is coplanar with the upper surface of the cushion when the seat assembly is in the flat configuration.

7. The reclining seat of claim 1, wherein the upper surface of the seat back, the upper surface of the seat bottom, and the upper surface of the leg support are each flat when the seat assembly is in the flat configuration.

8. The reclining seat of claim 1, wherein the arm support moves towards an aft portion of the seat assembly as the seat assembly moves to the flat configuration.

9. The reclining seat of claim 8, wherein an aft end of the arm support remains continuously in contact with the back support as the seat assembly moves between the upright configuration and the flat configuration.

10. The reclining seat of claim 1, further comprising a cushion extending over the seat back and the seat bottom and the leg support, the cushion having a uniform thickness along an entire longitudinal length of the cushion wherein:
   wherein the upper surface of the arm support is coplanar with the upper surface of the cushion when the seat assembly is in the flat configuration
   the upper surface of seat back, the upper surface of the seat bottom, the upper surface of the leg support, and the upper surface of the arm support are each parallel to one another and canted at an angle of less than ten degrees with respect to the floor surface when the seat assembly is in the flat configuration, wherein the arm support is pivotally coupled with both the seat bottom and the seat back, wherein the arm support moves towards an aft portion of the seat assembly as the seat assembly moves to the flat configuration, and wherein an aft end of the arm support remains continuously in contact with the back support as the seat assembly moves between the upright configuration and the flat configuration.

11. A reclining seat comprising:

a seat bottom;

a seat back coupled with the seat bottom;

a leg support coupled with the seat bottom; and an arm support coupled with one of the seat back and the seat bottom, a telescoping buttress coupling the arm support to the one of the seat back and the seat bottom, wherein the seat bottom, the seat back, the leg support and the arm support comprise a seat assembly;

wherein the seat assembly is configured to be supported on a floor surface, wherein the seat assembly is configured to move between an upright configuration, a reclined configuration, and a flat configuration, wherein the seat back and the leg support are transverse to the seat bottom, and wherein the arm support is transverse to the seat back when the seat assembly is in the upright configuration, wherein the seat back and the leg support are reclined with respect to the floor surface when the seat assembly is in the reclined configuration, wherein the seat back, the seat bottom, the leg support and the arm support are each longitudinally aligned with one another when the seat assembly is in the flat configuration, and wherein an upper surface of the seat back, an upper surface of the seat bottom, and an upper surface of the leg support are each coplanar with one another when the seat assembly is in the flat configuration and wherein the upper surface of the arm support is substantially coplanar with the upper surface of the seat back, the upper surface of the seat bottom and the upper surface of the leg support when the seat assembly is in the flat configuration.

12. The reclining seat of claim 11, wherein the upper surface of seat back, the upper surface of the seat bottom, the upper surface of the leg support, and the upper surface of the arm support are each parallel to one another and canted at an angle of less than ten degrees with respect to the floor surface when the seat assembly is in the flat configuration.

13. The reclining seat of claim 11, wherein the arm support is coupled with both the seat bottom and the seat back.

14. The reclining seat of claim 13, wherein the seat assembly is further configured to move to a zero-gravity position and wherein the seat back and the leg support are reclined with respect to the floor surface, and the seat bottom and the arm support is inclined with respect to the floor surface when the seat assembly is in the zero-gravity configuration.

15. The reclining seat of claim 11, further comprising a cushion extending over the seat back and the seat bottom and the leg support, the cushion having a uniform thickness along an entire longitudinal length of the cushion.

16. The reclining seat of claim 15, wherein the upper surface of the arm support is coplanar with the upper surface of the cushion when the seat assembly is in the flat configuration.

17. The reclining seat of claim 11, wherein the upper surface of the seat back, the upper surface of the seat bottom, and the upper surface of the leg support are each flat when the seat assembly is in the flat configuration.

18. The reclining seat of claim 11, wherein the arm support moves towards an aft portion of the seat assembly as the seat assembly moves to the flat configuration.

19. The reclining seat of claim 18, wherein an aft end of the arm support remains continuously in contact with the back support as the seat assembly moves between the upright configuration and the flat configuration.

20. The reclining seat of claim 11, further comprising a cushion extending over the seat back and the seat bottom and the leg support, the cushion having a uniform thickness along an entire longitudinal length of the cushion wherein:

wherein the upper surface of the arm support is coplanar with the upper surface of the cushion when the seat assembly is in the flat configuration the upper surface of seat back, the upper surface of the seat bottom, the upper surface of the leg support, and the upper surface of the arm support are each parallel to one another and canted at an angle of less than ten degrees with respect to the floor surface when the seat assembly is in the flat configuration, wherein the arm support is pivotally coupled with both the seat bottom and the seat back, wherein the arm support moves towards an aft portion of the seat assembly as the seat assembly moves to the flat configuration, and wherein an aft end of the arm support remains continuously in contact with the back support as the seat assembly moves between the upright configuration and the flat configuration.

* * * * *